United States Patent
Blandin et al.

(10) Patent No.: US 10,043,517 B2
(45) Date of Patent: Aug. 7, 2018

(54) AUDIO-BASED EVENT INTERACTION ANALYTICS

(71) Applicant: International Business Machines Corporation, Armonk, NY (US)

(72) Inventors: Sebastien Blandin, Singapore (SG); Karthik Nandakumar, Singapore (SG); Laura Wynter, Westport, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/963,295

(22) Filed: Dec. 9, 2015

(65) Prior Publication Data

US 2017/0169816 A1 Jun. 15, 2017

(51) Int. Cl.
| | |
|---|---|
| *G10L 15/26* | (2006.01) |
| *G06F 17/27* | (2006.01) |
| *G10L 15/08* | (2006.01) |
| *G10L 25/48* | (2013.01) |
| *G10L 15/02* | (2006.01) |

(52) U.S. Cl.
CPC .......... *G10L 15/26* (2013.01); *G06F 17/2785* (2013.01); *G10L 15/08* (2013.01); *G10L 25/48* (2013.01); *G10L 2015/025* (2013.01); *G10L 2015/088* (2013.01)

(58) Field of Classification Search
None
See application file for complete search history.

(56) References Cited

U.S. PATENT DOCUMENTS

| | | | |
|---|---|---|---|
| 6,687,671 B2 | 2/2004 | Gudorf et al. | |
| 7,529,669 B2 | 5/2009 | Ravi et al. | |
| RE43,386 E | * 5/2012 | Blair | G10L 17/26 370/218 |
| 8,214,242 B2 | 7/2012 | Agapi et al. | |
| 8,214,748 B2 | 7/2012 | Srikanth et al. | |

(Continued)

FOREIGN PATENT DOCUMENTS

| | | |
|---|---|---|
| CA | 2311439 C | 5/2007 |
| EP | 1531458 B1 | 4/2008 |

(Continued)

OTHER PUBLICATIONS

Kim et al.; "Learning about Meetings"; Data Mining and Knowledge Discovery Journal; 2014; 27 pages; <http://people.csail.mit.edu/beenkim/>.

(Continued)

*Primary Examiner* — Douglas Godbold
(74) *Attorney, Agent, or Firm* — Edward J. Wixted, III; Lance I. Hochhauser; Aaron N. Pontikos

(57) ABSTRACT

In an approach for audio based event analytics, a processor receives a recording of audio from an event. A processor collects information about the event and a list of participants. A processor segments the recording into, at least, a plurality of utterances. A processor analyzes the segmented recording. A processor summarizes the recording based on the segmentation and the analysis. A processor generates insights about interactions patterns of the event based on the segmentation and the analysis.

11 Claims, 5 Drawing Sheets

(56) References Cited

U.S. PATENT DOCUMENTS

| | | | | |
|---|---|---|---|---|
| 8,484,040 | B2* | 7/2013 | Ashour | G06Q 10/10 |
| | | | | 705/1.1 |
| 8,698,872 | B2* | 4/2014 | Begeja | H04N 7/147 |
| | | | | 348/14.01 |
| 2001/0047261 | A1* | 11/2001 | Kassan | G10L 15/30 |
| | | | | 704/270 |
| 2006/0149558 | A1* | 7/2006 | Kahn | G10L 15/063 |
| | | | | 704/278 |
| 2007/0048715 | A1* | 3/2007 | Miyamoto | G06F 17/2745 |
| | | | | 434/308 |
| 2007/0129942 | A1 | 6/2007 | Ban et al. | |
| 2007/0277092 | A1 | 11/2007 | Basson et al. | |
| 2008/0201143 | A1* | 8/2008 | Olligschlaeger | H04M 3/2281 |
| | | | | 704/235 |
| 2009/0006102 | A1* | 1/2009 | Kan | G10L 25/00 |
| | | | | 704/500 |
| 2009/0063151 | A1* | 3/2009 | Arrowood | G06F 17/30746 |
| | | | | 704/254 |
| 2009/0099845 | A1* | 4/2009 | George | G10L 15/26 |
| | | | | 704/235 |
| 2009/0119246 | A1* | 5/2009 | Kansal | G06F 17/30038 |
| 2009/0204399 | A1* | 8/2009 | Akamine | G10L 15/1822 |
| | | | | 704/235 |
| 2010/0031142 | A1* | 2/2010 | Nagatomo | G10L 15/26 |
| | | | | 715/254 |
| 2010/0114571 | A1* | 5/2010 | Nagatomo | G06F 17/30026 |
| | | | | 704/235 |
| 2011/0055227 | A1* | 3/2011 | Igarashi | H04N 7/15 |
| | | | | 707/750 |
| 2011/0082874 | A1 | 4/2011 | Gainsboro et al. | |
| 2011/0099006 | A1* | 4/2011 | Sundararaman | G10L 15/26 |
| | | | | 704/208 |
| 2012/0078626 | A1* | 3/2012 | Tsai | G10L 15/26 |
| | | | | 704/235 |
| 2012/0233257 | A1 | 9/2012 | Ashour et al. | |
| 2012/0239403 | A1* | 9/2012 | Cano | G10L 15/02 |
| | | | | 704/254 |
| 2012/0284640 | A1 | 11/2012 | Sloyer et al. | |
| 2013/0179150 | A1* | 7/2013 | Eriksson | G06Q 10/10 |
| | | | | 704/9 |
| 2014/0278377 | A1* | 9/2014 | Peters | G10L 15/1822 |
| | | | | 704/9 |
| 2015/0149171 | A1* | 5/2015 | Goldman | G10L 15/26 |
| | | | | 704/235 |
| 2015/0195406 | A1* | 7/2015 | Dwyer | H04M 3/5175 |
| | | | | 379/265.07 |
| 2015/0279390 | A1* | 10/2015 | Mani | G06F 17/30719 |
| | | | | 704/235 |
| 2016/0163333 | A1* | 6/2016 | Totzke | G10L 15/265 |
| | | | | 704/235 |
| 2016/0189713 | A1* | 6/2016 | Liu | G06F 17/248 |
| | | | | 704/235 |
| 2016/0329050 | A1* | 11/2016 | Godewyn | G10L 25/54 |
| 2017/0046411 | A1* | 2/2017 | D'Souza | G06F 17/277 |

FOREIGN PATENT DOCUMENTS

| | | |
|---|---|---|
| WO | 0213522 A2 | 2/2002 |
| WO | 2007086042 A3 | 8/2007 |
| WO | 2008023344 A3 | 2/2008 |

OTHER PUBLICATIONS

Maskey et al.; "Comparing Lexical, Acoustic/Prosodic, Structural and Discourse Features for Speech Summarization"; Interspeech, 2005; Sep. 4-8; Lisbon, Portugal; pp. 621-624.

Popescu-Belis et al.; "Finding Information in Multimedia Meeting Records"; IEEE Computer Society; Apr.-Jun. 2012; © 2012, IEEE; pp. 48-57.

Riedhammer et al.; "Long story short—Global unsupervised models for keyphrase based meeting summarization"; Speech Communication Journal, vol. 52, Issue 10, Oct. 2010; Jun. 17, 2010; © 2010, Elsevier B.V.; pp. 1-15.

Shivappa et al; "Hierarchical Audio-Visual Cue Integration Framework for Activity Analysis in Intelligent Meeting Rooms"; IEEE, 2009; pp. 107-114.

Tur et al; "The CALO Meeting Assistant System"; IEEE Transactions on Audio, Speech, and Language Processing, vol. 18, No. 6, Aug. 2010; © 2010, IEEE; pp. 1601-1611.

"Web Services Polling to Update Sound Masking System"; IP.com Prior Art Database Technical Disclosure; IP.com No. 000237135; Electronic Publication: Jun. 4, 2014; pp. 1-3.

"Wireless Calendar Meeting Automation and Audit with Wireless Presence Detection"; IP.com Prior Art Database Technical Disclosure; IP.com No. 000131895; Electronic Publication: Nov. 21, 2005; 2 pages.

* cited by examiner

AUDIO-BASED EVENT INTERACTION ANALYTICS

BACKGROUND

The present invention relates generally to the field of audio based analytics, and more particularly to directly analyzing audio signals recorded at an event and correlating the audio signals with additional sources of information about the event.

Audio mining is a technique by which the content of an audio signal can be automatically analyzed and searched. A commonly used method for audio mining is automatic speech recognition, where the analysis tries to identify any speech within the audio. The audio will typically be processed by an automatic speech recognition system in order to identify word or phoneme units that are likely to occur in the spoken content. This information may either be used immediately in pre-defined searches for keywords or phrases (a real-time "word spotting" system), or the output of the speech recognizer may be stored in an index file. One or more audio mining index files can then be loaded at a later date in order to run searches for keywords or phrases.

Audio mining systems using speech recognition are often divided into two groups: those that use Large Vocabulary Continuous Speech Recognizers (LVCSR) and those that use phonetic recognition. LVCSR needs to have hundreds of thousands of words to match the audio against. The output however is a stream of words, making it richer to work with. Since the complete semantic context is in the index, it is possible to find and focus on business issues very rapidly. Phonetic recognition uses the sounds of speech, specifically the physical properties of speech sounds or signs, their physiological production, acoustic properties, auditory perception, and neurophysiological status to recognize speech sounds and the role of the auditory system.

Audio analytics is the process of analyzing audio recordings to gather information, bring structure to speaker's interactions or expose information buried in speaker's interactions. Audio analytics often includes elements of automatic speech recognition, where the identities of spoken words or phrases are determined. One use of speech analytics applications is to spot spoken keywords or phrases, either as alerts on live audio or as a post-processing step on recorded speech. Other uses include categorization of speech, for example in the contact center environment, to identify calls from unsatisfied customers.

SUMMARY

Aspects of an embodiment of the present invention disclose a method, computer program product, and computing system for audio based event analytics. A processor receives a recording of audio from an event. A processor collects information about the event and a list of participants. A processor segments the recording into, at least, a plurality of utterances. A processor analyzes the segmented recording. A processor summarizes the recording based on the segmentation and the analysis. A processor generates insights about interactions patterns of the event based on the segmentation and the analysis.

DETAILED DESCRIPTION

Figure 1:
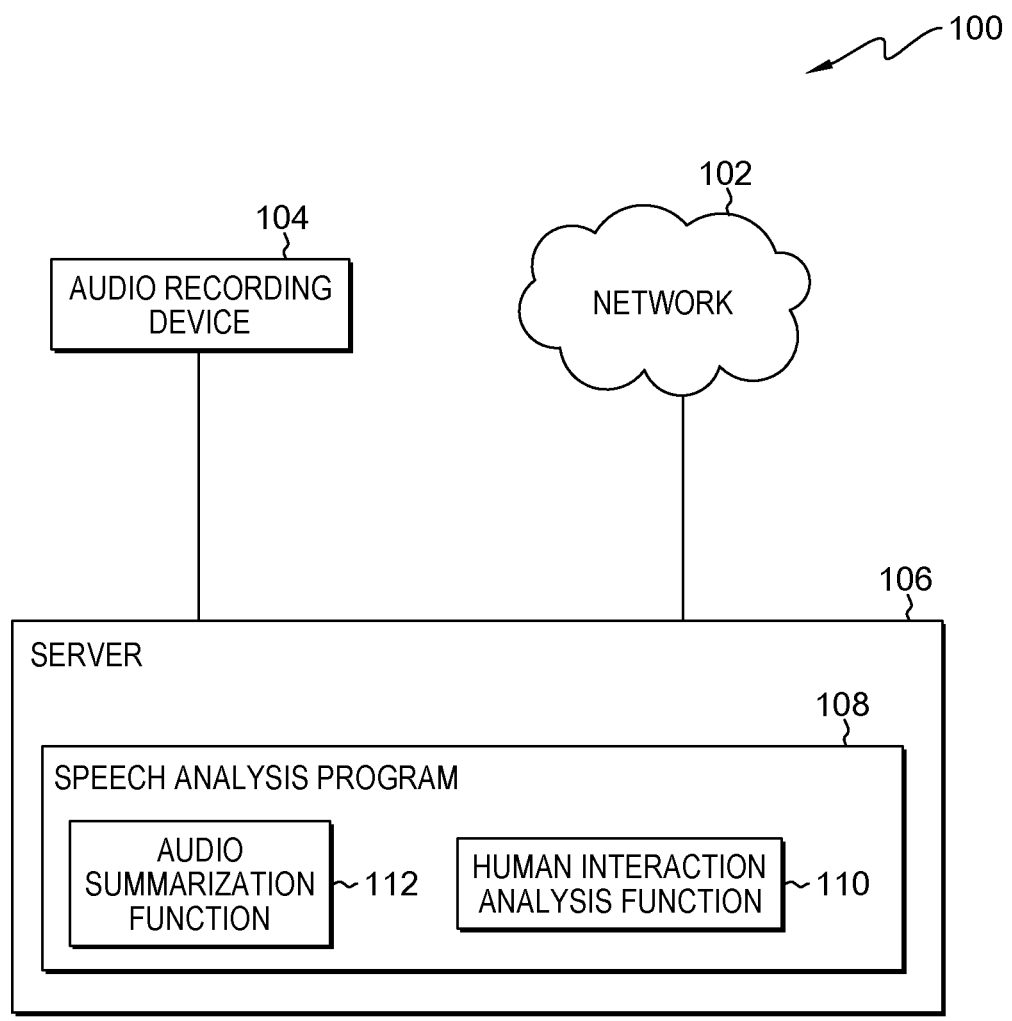
FIG. 1 depicts a block diagram depicting a computing environment, in accordance with one embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects may generally be referred to herein as a "circuit," "frame", or "system." Furthermore, aspects of the present invention may take the form of a computer program product embodied in one or more computer readable medium(s) having computer readable program code/instructions embodied thereon.

Embodiments of the present invention recognize that automatic speech recognition is not sufficiently accurate when presented with conversational speech recorded at events such as business meetings. Speech recorded at such events presents many challenges including the presence of multiple speakers, overlapping/back-channel speech, interruptions, and responding speech. Therefore, solely relying on automatic speech recognition for audio analytics may not lead to satisfactory results.

Embodiments of the present invention recognize that events such as business meetings are often structured around a pre-agreed meeting agenda and supplementary information in the form of presentation slides and list of participants and their roles in the organization are available. These additional materials provide valuable contextual information that can be useful in understanding the structure of the event and topics under discussion. However, existing systems for audio analytics are not designed to exploit such supplementary materials. Therefore, embodiments of the present invention recognize that it is desirable to have an audio analytics system that (i) does not solely depend on converting the audio signals into text using automatic speech recognition and (ii) is able to effectively make use of the additional contextual information available about the event.

Embodiments of the present invention disclose an approach for directly analyzing audio signals and correlating the audio signals with additional sources of information to generate valuable intelligence about events involving voice conversations.

Audio analytics is relatively underexploited (as compared to analytics using structured data, video, text). Voice conversation remains the principal means of communication in most business interactions. Automatic correlation-based audio analytics can provide capabilities to understand principally sound-based events such as meetings. Embodiments of the present invention provide techniques for analyzing audio signals and correlating the audio signals with additional sources of information. Without requiring natural-language interpretation of the audio, the summary of an event may be generated automatically along with insights into the characteristics of the event and new functionality building from the insights.

One contribution of an embodiment of the present invention is analyzing audio signals by correlating them to additional event content (e.g., text materials, agendas, professional networks) to determine key characteristics of the event. In some embodiments, a summary of the event in terms of relevant sound snippets organized in a storyline is generated. Key phrases within an event are identified based on repetition and additional features. Statements by persons of importance are identified using pre-established voice signatures and identity information. Emotional characteristics of the event such as conflicts, disagreement, and whether contributions by an individual are generally accepted or not are also determined automatically. Analysis of event efficiency in terms of person-to-person communication, clarity of key messages, and structured presentation of action items and next steps is also performed.

The present invention will now be described in detail with reference to the Figures.

FIG. 1 depicts a block diagram of computing environment 100 in accordance with one embodiment of the present invention. FIG. 1 provides an illustration of one embodiment and does not imply any limitations regarding computing environment 100 in which different embodiments may be implemented. In the depicted embodiment, computing environment 100 includes, but is not limited to network 102, server 106, and audio recording device 104. Computing environment 100 may include additional computing devices, servers, computers, components, or additional devices not shown. It should be appreciated that FIG. 1 provides only an illustration of one implementation and does not imply any limitations with regard to the environments in which different embodiments may be implemented. Many modifications to the depicted environment may be made.

Network 102 may be a local area network (LAN), a wide area network (WAN) such as the Internet, any combination thereof, or any combination of connections and protocols support communications between server 106, audio recording device 104, and additional computing devices connected to network 102 in accordance with embodiments of the invention. Network 102 may include wired, wireless, or fiber optic connections.

Audio recording device 104 is an acoustic-to-electric transducer or sensor which converts the sounds in air into an electrical signal. Audio recording device 104 can be, for example, a dynamic, electret condenser, piezoelectric, or any additional forms or styles of microphone which convert acoustic sounds into an electrical signal. A dynamic microphone uses electromagnetic induction in the production of an electromotive force across a conductor when the conductor is exposed to a varying magnetic field. An electret condenser microphone is a microphone which eliminates the need for a polarizing power supply by using a permanently charged material. A piezoelectric microphone detects sound waves based on the pressure they apply on the piezoelectric material, creating a voltage change to produce electrical signal. The audio recording device 104 can also be a microphone array or a collection of microphones distributed spatially. The audio recording device 104 may also be embedded within other devices such as a telephone, mobile devices such as smartphone or tablet, or a computer. In the depicted embodiment, audio recording device 104 is connected to server 106. In additional embodiments, audio recording device 104 can be connected to network 102, or additional computing devices, so long as audio recording device 104 can communicate with speech analysis program 108.

Server 106 may be described in the general context of computer system executable instructions, such as program modules, being executed by a computer system. Generally, program modules may include routines, programs, objects, components, logic, data structures, and so on, which perform particular tasks or implement particular abstract data types. In additional embodiments, server 106 may be a desktop computer, laptop computer, tablet computer, netbook computer, personal computer (PC), a desktop computer, mobile device, or any programmable electronic device capable of receiving an audio signal from audio recording device 104. In additional embodiments, server 106 may be any electronic device or computing system capable of sending and receiving data via network 102. In additional embodiments, server 106 may be practiced in distributed cloud computing environments, where tasks are performed by remote processing devices that are connected through a communications network. In a distributed cloud computing environment, program modules may be located in both local and remote computer system storage media including memory storage devices. In the depicted embodiment, server 106 is connected to network 102 and audio recording device 104.

Speech analysis program 108 controls the technique for directly analyzing audio signals and correlating the signals with additional sources of information (e.g., meeting agenda, professional network, meeting presentations, etc.), with the goal of generating valuable intelligence about events that principally involve voice conversations. In one embodiment, speech analysis program 108 performs acoustic segmentation of the event audio, whereby the audio is partitioned into pauses and individual utterances. An utterance is a spoken word, statement, or sound without any pauses or speaker changes. In another embodiment, speech analysis program 108 performs or applies a natural language assessment of the audio or written version of the event to gather information related to predetermined criteria. In additional embodiments, speech analysis program 108 may use part of speech tagging, shallow parsing, dependency parsing, or additional natural language processing techniques. In another embodiment, speech analysis program 108 determines the prosodic characteristics of speech such as pitch of the voice or energy level of the speaker. In additional embodiments, speech analysis program 108 uses keyword spotting to search the audio or written version of the event for predetermined words, terms, or phrases. In yet another embodiment, speech analysis program 108 uses voice recognition to tag each speech utterance with a speaker label. In the depicted embodiment, speech analysis program 108 is located on server 106. In additional embodiments, speech analysis program 108 may be located on additional servers provided speech analysis program 108 has access to audio recording device 104.

Human interaction analysis function 110 controls the mining of the audio signals to generate insights about the characteristics of the event. In one embodiment, human interaction analysis function 110 creates a map or a graph illustrating the interactions between the participants, adding weight to nodes related to position or importance in the meeting. In additional embodiments, human interaction analysis function 110 adjusts the weight of the lines on the map related to a function of communication time between speaker and responder. In additional embodiments, human interaction analysis function 110 determines the meeting communication efficiency by creating diagrams showing which speaker-responder interactions were beneficial and which speaker responder-interactions were not. In the depicted embodiment, human interaction analysis function 110 is located on speech analysis program 108. In additional embodiments, human interaction analysis function 110 may be located on additional servers provided speech analysis program 108 has access to human interaction analysis function 110. In additional embodiments, human interaction analysis function 110 may be a function of additional programs, or a standalone program located on server 106, additional servers, or additional computing devices which are connected to server 106 via network 102; provided human interaction analysis function 110 is accessible by speech analysis program 108.

Audio summarization function 112 controls the segmentation of the event audio. In one embodiment, audio summarization function 112 performs a multilayered segmentation. The multilayered segmentation may be, for example, creating a layer which partitions the audio into pauses and utterances. Another layer which identifies one or more dialog acts within each utterance. The dialog act within each utterance may relate to the speakers intention (e.g., question, request, suggestion, agreement, etc.). Yet another layer may be grouping the utterances into snippets. A snippet is a contiguous sequence of utterances regarding the same issue or topic. In additional embodiments, audio summarization function 112 uses the layers to classify and rank the snippets based on predetermined requirements. The predetermined requirements may be, for example, relevance, importance, salience, or the like. The classification may be, for example, based on prosodic features such as pitch and energy, speaker turns and overlap features, pause and utterance durations, statistics of dialog acts within each snippet, predetermined criteria related to the event, information related to the speaker, such as, for example, the speakers job position, if the speaker is the leader of the event, importance to the topic being discussed, or the like. In additional embodiments, audio summarization function 112 organizes a storyline from the event using the snippets and additional information from the event. In the depicted embodiment, audio summarization function 112 is located on speech analysis program 108. In additional embodiments, audio summarization function 112 may be located on additional servers provided speech analysis program 108 has access to audio summarization function 112. In additional embodiments, audio summarization function 112 may be a function of additional programs, or a standalone program located on server 106, additional servers, or additional computing devices which are connected to server 106 via network 102; provided audio summarization function 112 is accessible by speech analysis program 108.

Figure 2:
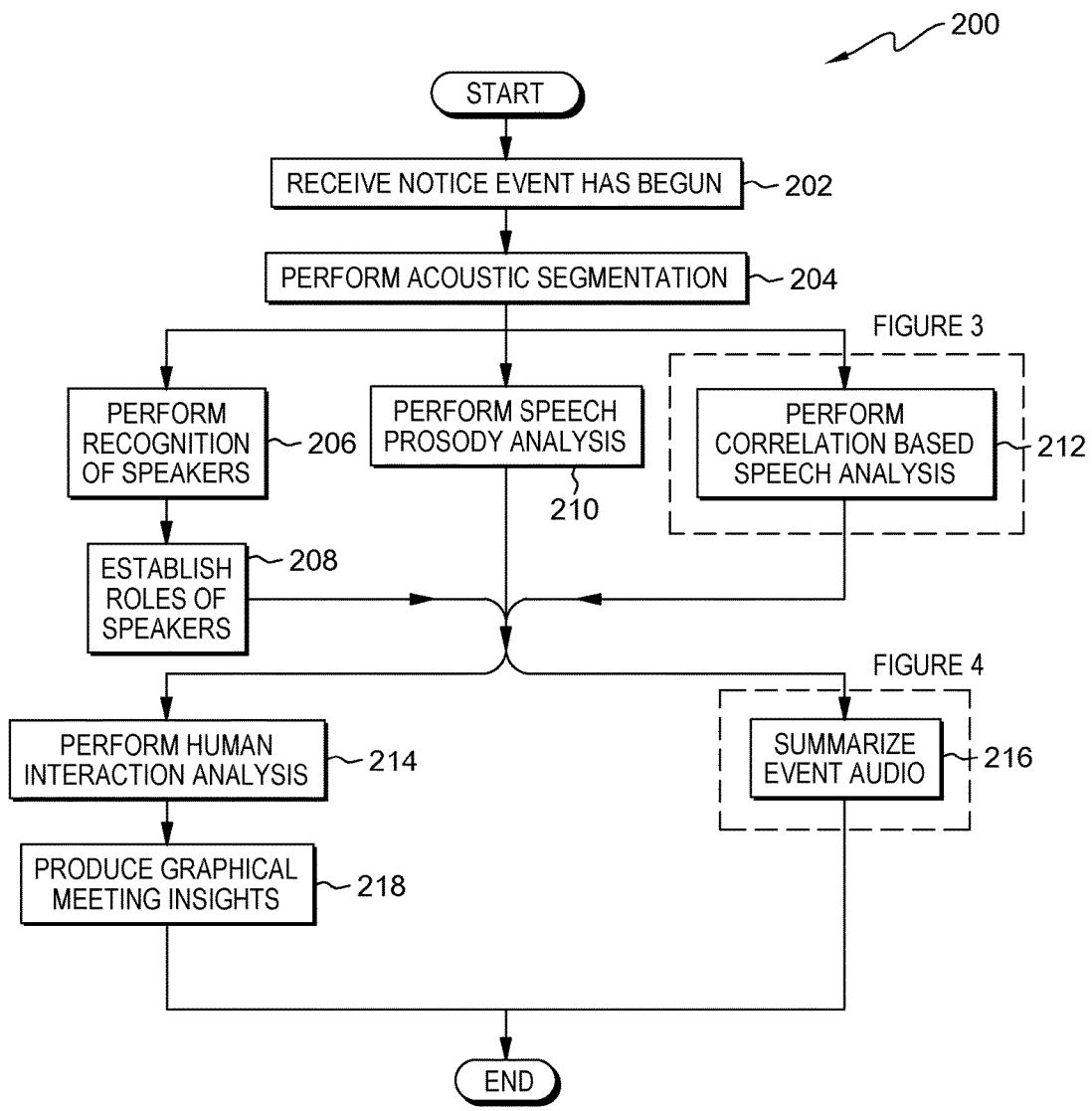
FIG. 2 depicts a flowchart of the operational steps taken by a speech analysis program to analyze the event and produce summaries of the event, within the computing environment of FIG. 1, in accordance with an embodiment of the present invention.

FIG. 2 depicts a flowchart 200 of the operational steps taken by speech analysis program to analyze the event and produce the summaries of the event, within computing environment 100 of FIG. 1, in accordance with an embodiment of the present invention. FIG. 2 provides an illustration of one embodiment and does not imply any limitations regarding computing environment 100 in which different embodiments may be implemented. Many modifications to the depicted flowchart may be made.

In step 202, speech analysis program 108 receives notice that an event has begun. Speech analysis program 108 receives a notification that informs speech analysis program 108 that the event has begun. This notification may be, for example, a user activating speech analysis program 108, a participant of the event saying a predetermined keyword to activate speech analysis program 108, or speech analysis program 108 activating itself at a predetermined time at which the event is supposed to begin. In one embodiment, speech analysis program 108 receives notice through audio recording device 104. In additional embodiments, speech analysis program 108 receives notice through additional devices.

In step 204, speech analysis program 108 performs acoustic segmentation. Speech analysis program 108 gathers the continuous speech signals from the event and transforms the continuous speech signals into a set of acoustic segments. The acoustic segments represent each utterance from each participant (without distinguishing between each participant) of the event as well as the lack of utterances (e.g., silence, pauses in speech, etc.). In one embodiment, speech analysis program 108 uses phonetic recognition (e.g., distinctive feature bundles, phonemes, or syllables) to create the utterances. In additional embodiments, speech analysis program 108 identifies each utterance using various signal representation based on models of the human auditory system. In additional embodiments, speech analysis program 108 identifies each utterance using spectral representations based on discrete Fourier transforms or linear predictions. In additional embodiments, speech analysis program 108 creates an individual utterance for each segment of speech regardless of the speaker. In additional embodiments, speech analysis program 108 creates a single utterance for each participant at the event. In the depicted embodiment, after speech analysis program 108 performs acoustic segmentation, speech analysis program 108 performs step 206, step 210, and step 212 substantially simultaneously. In additional embodiments, speech analysis program 108 can perform the steps in a sequential order, or a portion of the steps substantially simultaneously.

In step 206, speech analysis program 108 performs recognition of speakers. Speech analysis program 108 compiles the utterances and groups the utterances by the speaker by recognizing each individual speaker based on the vocal tones produced by each speaker. Speaker or voice recognition is the process of recognizing who is speaking based on unique characteristics included within the speech signal. Speech analysis program 108 may, for example, recognize each individual speaker at the event using a form of speaker identification. Each individual at the event has a distinct vocal patent similar to each of our finger prints, based on which speech analysis program 108 is able to distinguish between the individuals at the event using speaker identification. In one embodiment, speech analysis program 108 uses a Gaussian mixture speaker model to identify each speaker at the event. In additional embodiments, speech analysis program 108 uses additional forms of biometrics to identify each individual at the event. Speech analysis program 108 uses speaker diarisation to recognize when the same individual is speaking at the event. Diarisation is the process of partitioning an audio stream into homogenous segments according to the speaker identity. This assists speech analysis program 108 with grouping utterances from the same speaker together. In another embodiment, speech analysis program 108 may perform diarisation by applying an unsupervised clustering on the individual utterances. In one embodiment, utterances containing multiple speakers (such as overlapping speech or backchannel) will be assigned to the cluster of the dominating speaker. In another embodiment, multiple soft labels may be assigned to an utterance containing multiple speakers. Since the said clustering step is an unsupervised process, there is no constraint on the number of clusters. In most practical scenarios, we have knowledge of the true number of speakers (list of meeting participants). Therefore, in one embodiment, the speaker clusters are merged to reach the true number of speakers. In additional embodiments, the identity of the speaker associated with each cluster is determined by adding audio samples from known speakers and tracking the audio sample in the final clusters.

In step 208, speech analysis program 108 establishes roles of speakers. Based on the identification of each speaker at the event, speech analysis program 108 is able to identify the role or position (e.g., leader of the meeting, job position, employee, guest, etc.) of each speaker at the event. In one embodiment, speech analysis program 108 via network 102 locates this information on additional computing devices or on the World Wide Web. In additional embodiments, speech analysis program 108 is given this information prior to, during (e.g., each individual states their name and position), or after the event.

In step 210, speech analysis program 108 performs speech prosody analysis. Speech prosody is concerned with the elements of speech which are not individual vowels or consonants, but are properties of syllables and larger units of speech (e.g., intonation, tone, stress, rhythm, emotional state, if the speaker is making a statement, question, or command, etc.). Speech analysis program 108 uses speech prosody analysis to determine the nature of the event and the interaction between the participants (e.g., cooperation, fights, disagreements, etc.). In one embodiment, speech analysis program 108 performs the prosody analysis between each participant and the additional participants. In additional embodiments, speech analysis program 108 performs the prosody analysis between the participants of the event as a whole. In one embodiment, the prosodic features extracted from the audio may include temporal pitch, energy characteristics of utterances, pitch range, intonational contour, declination patterns, utterance duration, pre-boundary lengthening phenomena, pause patterns, speaking rates, and the like.

In step 212, speech analysis program 108 performs correlation-based speech analysis. This step is further described in FIG. 3. In performing the correlation-based speech analysis, speech analysis program 108 mines the audio signal to detect the presence of structural keywords and contextual keywords. Structural keywords are words that may indicate a speaker's intention. For example, when a speech segment contains words such as "what," "why," "how," and the like, it may indicate that the speaker is asking a question. Similarly, words such as "yes," "yeah," and the like, may indicate agreement with a preceding statement. Contextual keywords may be, for example, keywords related to agenda items from the event, such as "action items," "follow-up," and the like, dates, times, locations, objectives, work assignments, and the like.

In step 214, speech analysis program 108 performs human interaction analysis function 110 based on the information gathered in steps 206, 208, 210, and 212. The human interaction analysis function 110 performed by speech analysis program 108 uses the information from the prior steps to determine meeting communication efficiency, conflicts, communication failure, disagreement, crisis, agreement, cooperation, synergy, teamwork, partnership between certain individuals, and the like. In one embodiment, speech analysis program 108 incorporates job role of each participant into the human interaction analysis. In additional embodiments, speech analysis program 108 identifies effective and ineffective partnerships between participants of the event. In additional embodiments, speech analysis program 108 identifies certain participants who created or dissolved conflicts which occurred during the event.

In step 216, audio summarization function 112 summarizes event audio. Audio summarization function 112 performs a multilayered segmentation of the meeting audio through grouping utterances into snippets. This step is further described in FIG. 4.

In step 218, speech analysis program 108 produces graphical meeting insights. Speech analysis program 108 uses the information gathered in step 214 to create a visual representation of the information.

Figure 3:
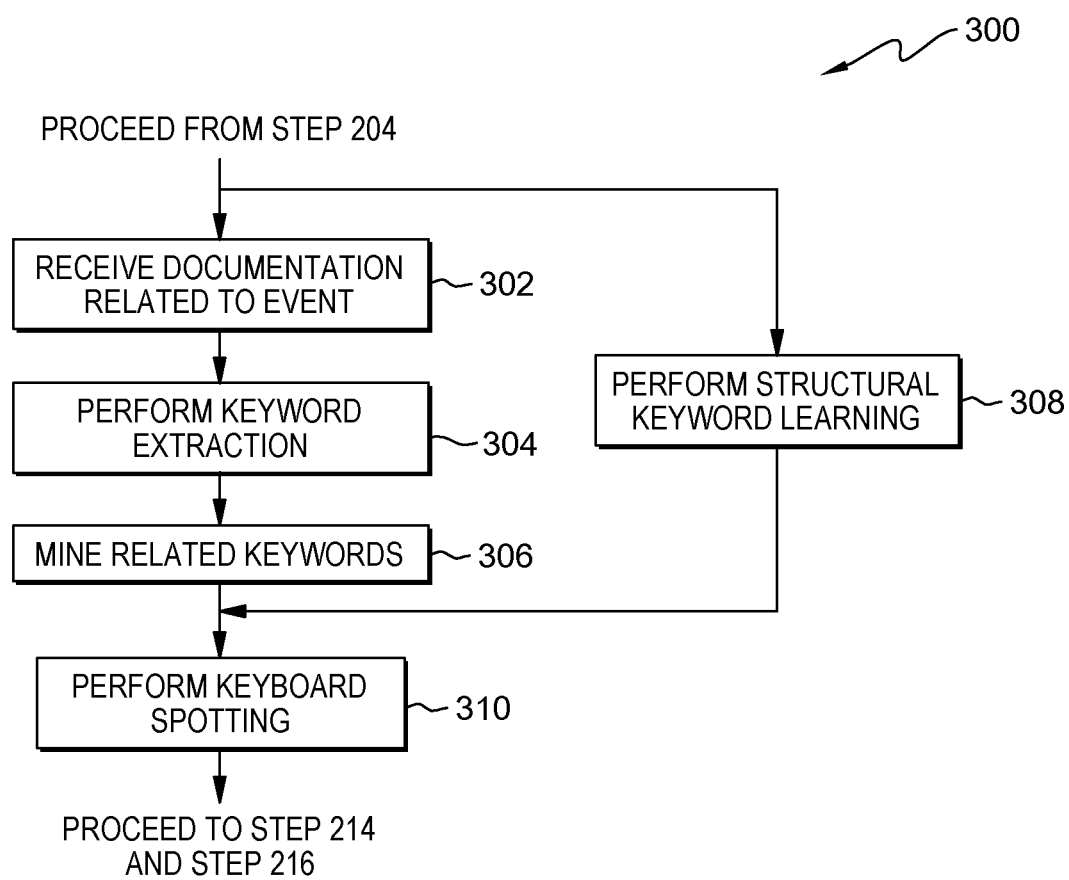
FIG. 3 depicts a flowchart of the operational steps taken by a correlation-based speech analysis function to detect the presence of structural keywords and contextual keywords, within computing environment 100 of FIG. 1, in accordance with an embodiment of the present invention.

FIG. 3 depicts a flowchart 300 of the operational steps taken by speech analysis program 108 to perform the correlation-based speech analysis (see FIG. 2, step 212) to detect the presence of structural keywords and contextual keywords, within computing environment 100 of FIG. 1, in accordance with an embodiment of the present invention. FIG. 3 provides an illustration of one embodiment and does not imply any limitations regarding computing environment 100 in which different embodiments may be implemented. Many modifications to the depicted flowchart may be made.

In step 302, speech analysis program 108 receives audio and written information related to an event. Speech analysis program 108 receives documentation (e.g., meeting agendas, online related material, background meeting corpus, list of meeting participants, etc.). Speech analysis program 108 also receives the audio from the event (e.g., in its full form, segmented form, individual utterances, etc.). In additional embodiments, speech analysis program 108 receives the event transcript or the event transcript with notations.

In step 304, speech analysis program 108 performs keyword extraction. The context of the words in the materials relates to understanding the meaning of the word related to the surrounding words, phrases, and paragraphs of the written words or of the transcript of the event. In one embodiment, speech analysis program 108 uses text analytics to parse through a portion of available material related to the event based on the contextual keywords or common themes the materials. Using natural language processing and at least one set of dictionaries and rules, speech analysis program 108 may perform text analytics on the materials. Text analytics can be performed using an Unstructured Information Management Architecture (UIMA) application configured to analyze contextual information in the materials.

In step 306, speech analysis program 108 mines related keywords. Data mining is the process of discovering patterns in data sets involving methods (e.g., machine learning, statistics, and artificial intelligence, etc.) to extract information from the data set and transform the data into an understandable structure for further use. Speech analysis program 108 uses the mined data related to the keywords to create a list of contextual keywords, which are relevant to the event and the topics that are to be discussed at the event.

In step 308, speech analysis program 108 performs structural keyword extraction. Structural keywords are words that may indicate a speaker's intention. For example, when a speech segment contains words such as "what," "why," "how," and the like, it may indicate that the speaker is asking a question. Similarly, words such as "yes," "yeah," and the like, may indicate agreement with a preceding statement. In one embodiment, speech analysis program 108 uses text analytics to parse through the transcripts of past events annotated with dialog act tags to identify structural keywords related to specific dialog acts. Using natural language processing and at least one set of dictionaries and rules, speech analysis program 108 can perform text analytics on the transcripts. Text analytics can be performed using an Unstructured Information Management Architecture (UIMA) application configured to analyze structural keywords within the materials.

In step 310, speech analysis program 108 performs keyword spotting. Keyword spotting involves spotting or locating the occurrence of structural and contextual keywords within the event audio, which can be achieved in a number of ways. In one embodiment, a phonetic transcription of both the keywords and the event audio are obtained and keywords are spotted within the audio by matching phoneme sequences. In additional embodiments, intermediate representations such as phonetic posteriorgrams, lattice representation, and the like can be used for matching phoneme sequences. In another embodiment, the keywords are converted into audio signals using a text-to-speech module (also known as speech synthesizer) and the audio signals corresponding to the keywords are correlated with the event audio using acoustic similarity measures to spot the occurrence of keywords within the event audio. In yet another embodiment, the event audio is transcribed into text using automatic speech recognition and the keywords are located within the transcribed text.

Figure 4:
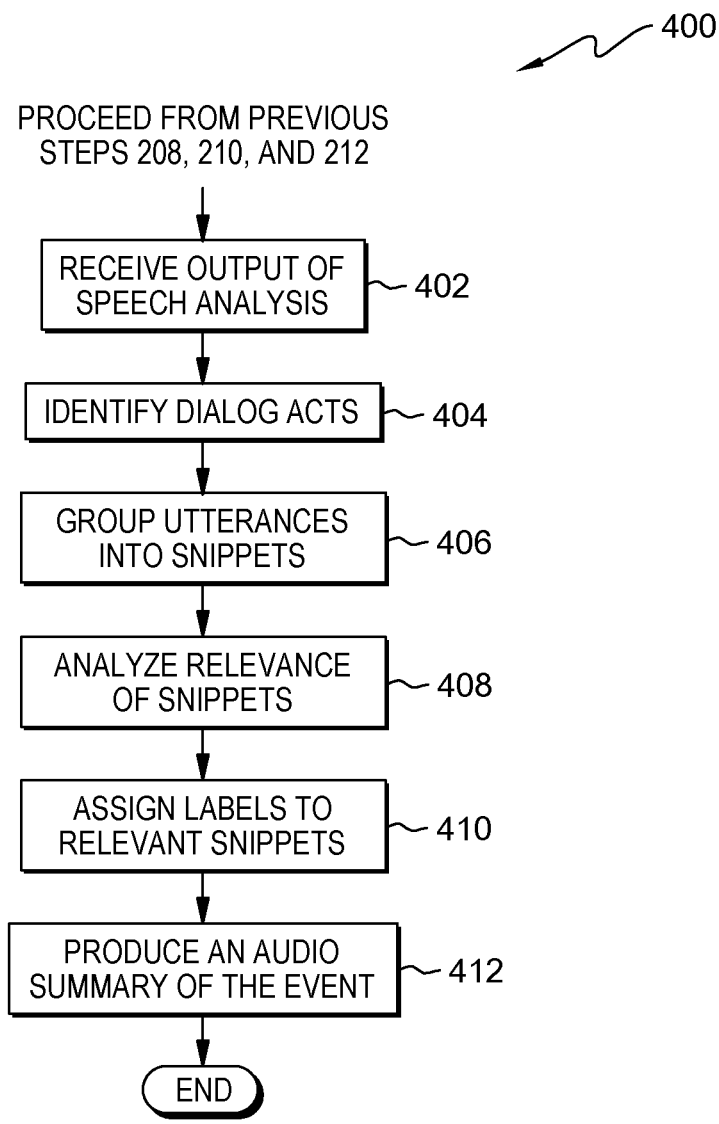
FIG. 4 depicts a flowchart of the operational steps taken by an audio summarization function to receive documents and audio from the event and create the summary of the event, within the computing environment of FIG. 1, in accordance with an embodiment of the present invention.

FIG. 4 depicts a flowchart of the operational steps taken by audio summarization function 112 to receive or collect documents and audio from the event and create the summary of the event, within computing environment 100 of FIG. 1, in accordance with an embodiment of the present invention. FIG. 4 provides an illustration of one embodiment and does not imply any limitations regarding computing environment 100 in which different embodiments may be implemented. Many modifications to the depicted flowchart may be made.

In step 402, audio summarization function 112 receives output of speech analysis. Audio summarization function 112 receives the resulting information from steps 208, 210, and 212. These steps are explained in detail above.

In step 404, audio summarization function 112 identifies dialog acts. Dialog acts convey the speaker's intention (e.g., question, request, suggestion, agreement, etc.). In one embodiment, audio summarization function 112 uses analytics to parse through the audio to identify the dialog acts from all the participants of the event. In another embodiment, audio summarization function 112 identifies the dialog acts of predetermined participants of the event. In one embodiment, speaker-change points and sufficiently long pauses within speaker-specific audio segments determine the boundaries between dialog acts. In additional embodiments, each dialog act is tagged with labels such as inform, elicit-inform, suggest, offer, elicit-offer-or-suggest, assessment, elicit-assessment, and the like. In another embodiment, dialog act tagging is performed based on the prosody features such as pitch and energy contours derived from the audio signal. In one embodiment, the frequency of occurrence of specific structural keywords may also be used for dialog act tagging in addition to the prosody features.

In step 406, audio summarization function 112 groups utterances into snippets. A snippet is a contiguous sequences of utterances about the same issue, topic, sub-topic, or the like. In one embodiment, audio summarization function 112 uses analytics to parse through the audio to identify utterances related to similar topics. In additional embodiments, audio summarization function 112 locates utterances related to one topic from a single participant. In additional embodiments, audio summarization function 112 locates utterances related to a similar topic from a plurality of participants of the event. Using natural language processing and at least one set of dictionaries and rules, audio summarization function 112 can perform analytics to group utterances into snippets.

In step 408, audio summarization function 112 analyzes the relevance of snippets. Each snippet may be related to a substantially different topic or issue. Potentially some of the topics or issues may not be relevant to the event (e.g., side arguments, small talk, talk before or after the event, etc.). Audio summarization function 112 analyzes each snippet for relevance and salience based on statistics of the dialog acts within each snippet. In one embodiment, audio summarization function 112 bases the relevance and salience of snippets on statistics of dialog acts within each snippet. In additional embodiments, audio summarization function 112 uses information about each individual speaker to assign a label, the information about each individual speaker, may be, for example, speaker's name, speaker's role, frequency of keywords spoken, or tone of the words spoken by the speaker. In another embodiment, it is also possible to skip the identification of dialog act and directly analyze the relevance of snippets based on prosodic features such as pitch and energy, speaker turn and overlap features, duration of pauses and utterances, frequency of occurrence of structural and contextual keywords, and the like.

In step 410, audio summarization function 112 assigns labels to relevant snippets. Audio summarization function 112 assigns a label to each snippet based on the frequency of occurrence of contextual keywords corresponding to predetermined topics regarding the event. In one embodiment, the topics of interest and the contextual keywords may be derived from the meeting agenda and other supplementary materials such as presentation slides.

In step 412, audio summarization function 112 produces an audio summary of the event. The audio summary of the event is a combination of the snippets to create a relevant and continuous summary of the event based on the spoken words, additional material and the interaction between the participants of the event. In one embodiment, audio summarization function 112 creates an audio summary of predetermined snippets related to specific topics during the event. In additional embodiments, audio summarization function 112 produces an audio summary with a graphical representation as well, the graphical representation can be, for example, a time line of when each snippet was spoken, showing when agreement or disagreement occurred between specific participants of the event, or to show relevant and irrelevant snippets based on a predetermined topic.

Figure 5:
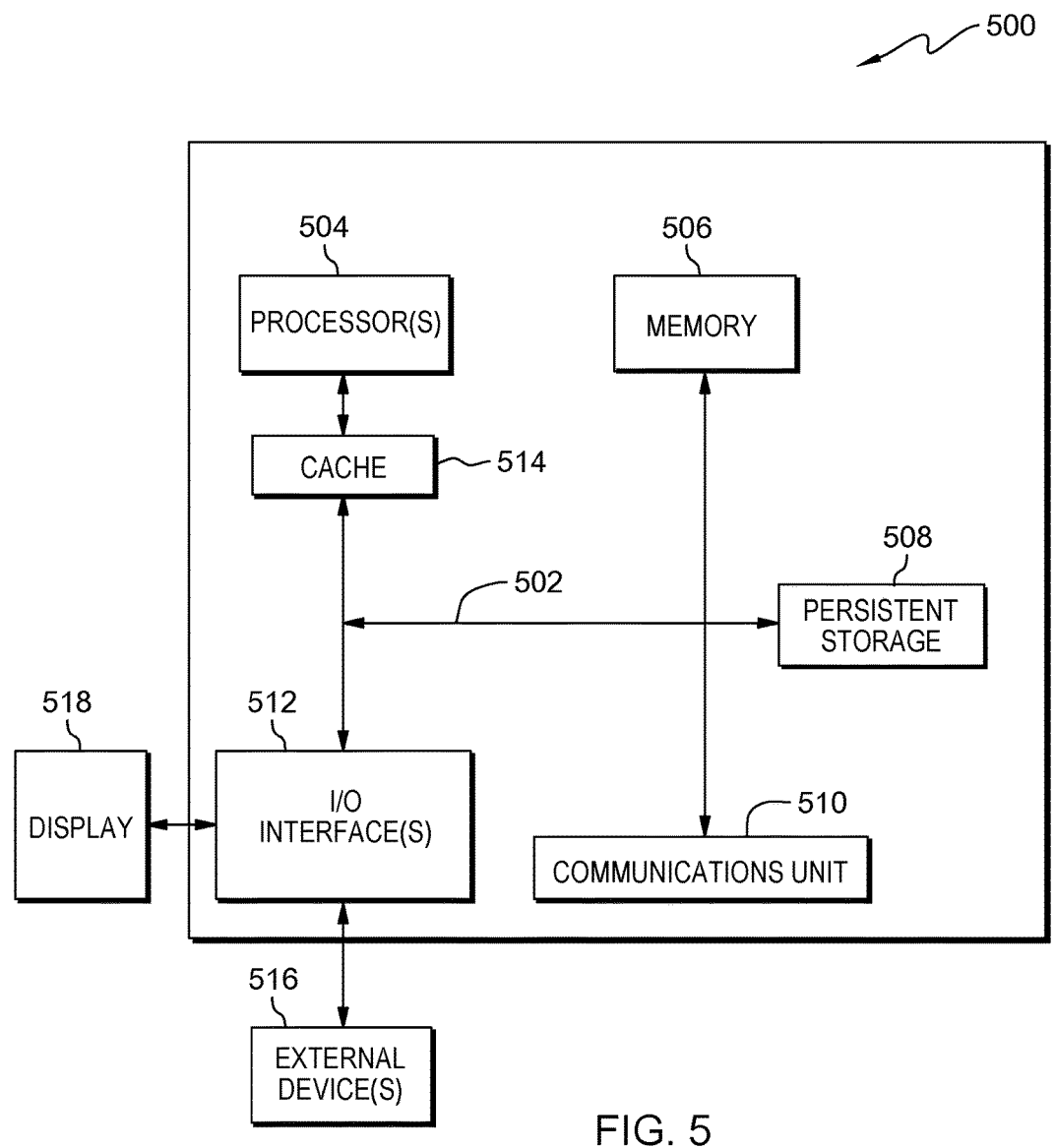
FIG. 5 depicts a block diagram of the internal and external components of the server of FIG. 1, in accordance with one embodiment of the present invention.

FIG. 5 depicts a block diagram 500 of components of server 106, within computing environment 100 of FIG. 1, in accordance with an illustrative embodiment of the present invention. It should be appreciated FIG. 5 provides only an illustration of one implementation and does not imply any limitations with regard to the environments in which different embodiments may be implemented. Many modifications to the depicted environment may be made.

Server 106 includes communications fabric 502, which provides communications between computer processor(s) 504, memory 506, persistent storage 508, communications unit 510, and input/output (I/O) interface(s) 512. Communications fabric 502 may be implemented with any architecture designed for passing data and/or control information between processors (such as microprocessors, communications and network processors, etc.), system memory, peripheral devices, and any additional hardware components within a system. For example, communications fabric 502 may be implemented with one or more buses.

Memory 506 and persistent storage 508 are computer-readable storage media. In one embodiment, memory 506 includes random access memory (RAM) and cache memory 514. In general, memory 506 can include any suitable volatile or non-volatile computer-readable storage media.

Memory 506 is stored for execution by one or more of the respective computer processors 504 of server 106 via one or more memories of memory 506 of server 106. In the depicted embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any additional computer-readable storage media which is capable of storing program instructions or digital information.

The media used by persistent storage 508 may also be removable. For example, a removable hard drive may be used for persistent storage 508. Additional examples include optical and magnetic disks, thumb drives, and smart cards that are inserted into a drive for transfer onto another computer-readable storage medium which is also part of persistent storage 508.

Communications unit 510, in the examples, provides for communications with additional data processing systems or devices, including server 106. In the examples, communications unit 510 includes one or more network interface cards. Communications unit 510 may provide communications through the use of either or both physical and wireless communications links.

I/O interface(s) 512 allows for input and output of data with additional devices which may be connected to server 106. For example, I/O interface 512 may provide a connection to external devices 516 such as a keyboard, keypad, camera, a touch screen, and/or some additional suitable input device. External devices 516 can also include portable computer-readable storage media such as, for example, thumb drives, portable optical or magnetic disks, and memory cards. Software and data used to practice embodiments of the present invention, e.g., speech analysis program 108, human interaction analysis function 110, audio summarization function 112 can each be stored on such portable computer-readable storage media and can be loaded onto persistent storage 508 of server 106 via I/O interface(s) 512 of server 106. I/O interface(s) 512 also connect to a display 518.

Display 518 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or additional freely propagating electromagnetic waves, electromagnetic waves propagating through a waveguide or additional transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In additional embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or additional programmable data processing apparatus to produce a machine, such that the instructions, which execute via the processor of the computer or additional programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or additional devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, additional programmable data processing apparatus, or additional device to cause a series of operational steps to be performed on the computer, additional programmable apparatus or additional device to produce a computer implemented process, such that the instructions which execute on the computer, additional programmable apparatus, or additional device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or table of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for audio based event analytics, the method comprising:
   segmenting, by one or more processors, an audio recording from an event into, at least, a plurality of pauses and a plurality of acoustic utterances based, at least in part, on acoustic segmentation, wherein each acoustic utterance in the plurality of utterances is an individual word;
   analyzing, by one or more processors, the plurality of acoustic utterances to identify at least a first keyword based, at least in part, on:
      mining, by one or more processors, at least the first keyword from a plurality of information about the event; and
      matching a phoneme sequence corresponding to the audio recording with the phoneme sequence corresponding to at least the first keyword;
   extracting, by one or more processors, speech prosody characteristics and dialog acts from the plurality of acoustic utterances;
   analyzing, by one or more processors, the speech prosody characteristics, the dialog acts, and at least the first keyword to determine a communication efficiency between a first participant and a second participant of the audio recording;
   grouping, by one or more processors, at least a first acoustic utterance and a second acoustic utterance of the plurality of acoustic utterances into a snippet based, at least in part, on the first acoustic utterance and the second acoustic utterance being related to a topic;
   determining, by one or more processors, that the topic associated with the snippet is relevant based, at least in part, on a frequency of occurrence of at least the first keyword included in the snippet; and
   producing, by one or more processors, an audio summary of relevant snippets generated from the audio recording.

2. The method of claim 1, wherein determining, by one or more processors, a relevance of the snippet is further based, at least in part, on:
   the plurality of information about the event and a list of participants; and
   associating, by one or more processors, the topic with the snippet based on the plurality of information about the event.

3. The method of claim 1, further comprising
   generating insights about interactions patterns of the event based, at least in part, on:
      mapping, by one or more processors, an acoustic utterance in the plurality of acoustic utterances to the first participant and the second participant; and
      identifying, by one or more processors, a type of interaction pattern between the first participant and the second participant based, at least in part, on the acoustic utterance.

4. The method of claim 1, wherein the information about the event is one or more documents containing text to be referenced during the event.

5. A computer program product for audio based event analytics, the computer program product comprising:
   one or more computer readable storage media and program instructions stored on the one or more computer readable storage media, the program instructions comprising:
   program instructions to segment, by one or more processors, an audio recording from an event into, at least, a plurality of pauses and a plurality of acoustic utterances based, at least in part, on acoustic segmentation, wherein each acoustic utterance in the plurality of utterances is an individual word;
   program instructions to analyze the plurality of acoustic utterances to identify at least a first keyword based, at least in part, on:
      program instructions to mine at least the first keyword from a plurality of information about the event;
      program instructions to match a phoneme sequence corresponding to the audio recording with the phoneme sequence corresponding to at least the first keyword;
   program instructions to extract speech prosody characteristics and dialog acts from the plurality of acoustic utterances;
   program instructions to analyze the speech prosody characteristics, the dialog acts, and at least the first keyword to determine a communication efficiency between a first participant and a second participant of the audio recording;
   program instructions to group at least a first acoustic utterance and a second acoustic utterance of the plurality of acoustic utterances into a snippet based, at least in part, on the first acoustic utterance and the second acoustic utterance being related to a topic;

program instructions to determine that the topic associated with the snippet is relevant based, at least in part, on a frequency of occurrence of at least the first keyword included in the snippet; and program instructions to produce an audio summary of relevant snippets generated from the audio recording.

6. The computer program product of claim 5, wherein the program instructions to determine a relevance of the snippet is further based, at least in part, on:

the plurality of information about the event and a list of participants; and program instructions to associate the topic with the snippet based on the plurality of information about the event.

7. The computer program product of claim 5, further comprising program instructions to generate insights about interactions patterns of the event based, at least in part, on:

program instructions to map an acoustic utterance in the plurality of acoustic utterances to the first participant and the second participant; and program instructions to identify a type of interaction pattern between the first participant and the second participant based, at least in part, on the acoustic utterance.

8. The computer program product of claim 5, wherein the information about the event is one or more documents containing text to be referenced during the event.

9. A computer system for audio based event analytics, the computer system comprising:

one or more computer processors, one or more computer readable storage media, and program instructions stored on the one or more computer readable storage media for execution by at least one of the one or more processors, the program instructions comprising:

program instructions to segment, by one or more processors, an audio recording from an event into, at least, a plurality of pauses and a plurality of acoustic utterances based, at least in part, on acoustic segmentation, wherein each acoustic utterance in the plurality of utterances is an individual word;

program instructions to analyze the plurality of acoustic utterances to identify at least a first keyword based, at least in part, on:

program instructions to mine at least the first keyword from a plurality of information about the event;

program instructions to match a phoneme sequence corresponding to the audio recording with the phoneme sequence corresponding to at least the first keyword;

program instructions to extract speech prosody characteristics and dialog acts from the plurality of acoustic utterances; and program instructions to analyze the speech prosody characteristics, the dialog acts, and at least the first keyword to determine a communication efficiency between a first participant and a second participant of the audio recording;

program instructions to group at least a first acoustic utterance and a second acoustic utterance of the plurality of acoustic utterances into a snippet based, at least in part, on the first acoustic utterance and the second acoustic utterance being related to a topic;

program instructions to determine that the topic associated with the snippet is relevant based, at least in part, on a frequency of occurrence of at least the first keyword included in the snippet; and program instructions to produce an audio summary of relevant snippets generated from the audio recording.

10. The computer system of claim 9, wherein the program instructions to determine a relevance of the snippet is further based, at least in part, on:

the plurality of information about the event and a list of participants; and program instructions to associate the topic with the snippet based on the plurality of information about the event.

11. The computer system of claim 9, further comprising program instructions to generate insights about interactions patterns of the event based, at least in part, on:

program instructions to map an acoustic utterance in the plurality of acoustic utterances to the first participant and the second participant; and program instructions to identify a type of interaction pattern between the first participant and the second participant based, at least in part, on the acoustic utterance.

\* \* \* \* \*